US 6,550,373 B2

(12) United States Patent
Hafezan et al.

(10) Patent No.: US 6,550,373 B2
(45) Date of Patent: Apr. 22, 2003

(54) HEATING ARRANGEMENT FOR AUTOMATED APPARATUS AND METHOD FOR COOKING

(75) Inventors: Siavosh Hafezan, Singapore (SG); Yong Siew Khow, Singapore (SG)

(73) Assignee: Food & Spice Co. PTE LTD (SG)

( * ) Notice: Subject to any disclaimer, the term of this patent is extended or adjusted under 35 U.S.C. 154(b) by 0 days.

(21) Appl. No.: 10/181,738

(22) PCT Filed: Feb. 9, 2001

(86) PCT No.: PCT/SG01/00037

§ 371 (c)(1),
(2), (4) Date: Jul. 22, 2002

(87) PCT Pub. No.: WO01/58329

PCT Pub. Date: Aug. 16, 2001

(65) Prior Publication Data

US 2003/0000395 A1 Jan. 2, 2003

(30) Foreign Application Priority Data

Feb. 9, 2000 (SG) ........................................ 2000007773
Feb. 8, 2001 (SG) ........................................ 2001006915

(51) Int. Cl.⁷ ............................. A23L 1/00; A47J 37/00; A47J 37/04
(52) U.S. Cl. ........................ 99/339; 99/340; 99/421 V; 99/419; 99/427; 99/443 R
(58) Field of Search ................... 99/339, 340, 330–334, 99/349, 419–421 V, 426, 427, 444–450, 443 R, 443 C; 126/25 R, 9 R, 41 R; 219/388, 386, 385, 389, 400, 405, 218

(56) References Cited

U.S. PATENT DOCUMENTS

| 2,581,570 | A | * | 1/1952 | Amanatides .............. 99/421 V |
| 2,687,080 | A | * | 8/1954 | Dorin ...................... 99/421 V |
| 5,477,028 | A | * | 12/1995 | Chang ..................... 219/386 |
| 5,575,196 | A | * | 11/1996 | Masel et al. .............. 99/419 X |
| 5,845,563 | A | * | 12/1998 | Haring et al. ............. 99/419 |
| 5,850,780 | A | * | 12/1998 | Mascia et al. ............. 99/427 |
| 5,855,164 | A | * | 1/1999 | Chiang .................... 99/340 |
| 5,866,876 | A | * | 2/1999 | Su ........................... 219/388 |
| 6,047,633 | A | * | 4/2000 | Khaytman ................ 99/419 X |
| 6,199,473 | B1 | * | 3/2001 | Dotan et al. .............. 99/332 |
| 6,336,397 | B1 | * | 1/2002 | Michel et al. ............. 99/427 |
| 6,363,836 | B1 | * | 4/2002 | Usherovich ............... 99/339 |
| 6,418,835 | B1 | * | 7/2002 | Lin .......................... 99/447 X |

* cited by examiner

*Primary Examiner*—Timothy F. Simone
(74) *Attorney, Agent, or Firm*—Lawrence Y. D. Ho

(57) ABSTRACT

A cooking apparatus comprising: a housing (122); at least one heating unit (170) disposed within and on the periphery of said housing (122), said heating unit (170) radiating substantially radially inwards to the centre of the cooking apparatus; at least one support plate (136) provided above said heating unit, said support plate (136) having an inclined surface for supporting and retaining flat dough for cooking; at least one support plate revolving means, coupled to said support plate (136), for rotating said support plate (136); and a means for maintaining the temperature of the top surface of said dough to allow equal cooking of top and bottom surfaces of said dough.

13 Claims, 2 Drawing Sheets

HEATING ARRANGEMENT FOR AUTOMATED APPARATUS AND METHOD FOR COOKING

FIELD OF THE INVENTION

The present invention relates to automated cooking apparatus. In particular, the present invention relates to an improved heating arrangement for oven-type cooking apparatus and method for using the same.

BACKGROUND OF THE INVENTION

In Singapore Patent Application No. 200000777-3 filed on Feb. 9, 2000, the applicant of the present invention described a novel, automated, oven-type cooking apparatus that could achieve the dual function of baking bread or dough based products and cooking skewered meats similar to that of a traditional tandoori oven.

The automated oven-type cooking apparatus as taught in Singapore Patent Application No. 200000777-3 achieves substantially the objectives of the invention: (1) capable of dual function of cooking bread and meat, (2) produces high quality and consistency without the monitoring of an experienced chef, and (3) features a compact and hygienic design that results in easy maintenance.

It is the ultimate objective of the applicant of the present invention to make available to almost all types of restaurants such automated oven-type cooking apparatus, in particular, fast food restaurants and catering specialists. Towards that end, the automated oven-type cooking apparatus taught in Singapore Patent Application No. 200000777-3 should have a throughput that is higher, weight less so that it is not only compact but portable; more energy efficient so that auxiliary source of fuel is obviated; and attain better safety in handling by non-professional kitchen staff.

OBJECT OF THE INVENTION

It is an object of the present invention to provide for an improved heating arrangement in automated oven-type cooking apparatus so that more bread and meats can be processed with consistent quality.

It is another object of the present invention to reduce the overall material weight of the automated oven-type cooking apparatus while optimizing the baking and skewering capacity of the equipment.

It is yet another object of the present invention to improve the overall safety in loading and unloading of breads and meats in and out of automated oven-type cooking apparatus.

SUMMARY OF THE INVENTION

The orientation of the heating unit of an automated oven-type cooling apparatus is changed from outwardly radiating direction to and inwardly radiating one. As a result, the center core of any automated oven-type cooking apparatus can make way for more meat skewers. Not only is the overall safety of handling breads and/or meat skewers improved, the heat differential between the top and bottom surface of the bread products is narrowed significantly. It follows that the browning of bread products such as naan is completed with the improved orientation of the heating unit while the cooking of skewered meats is unaffected. As a result, a truly portable oven-type cooking apparatus is realized.

DETAILED DESCRIPTION OF THE INVENTION

Figure 1:
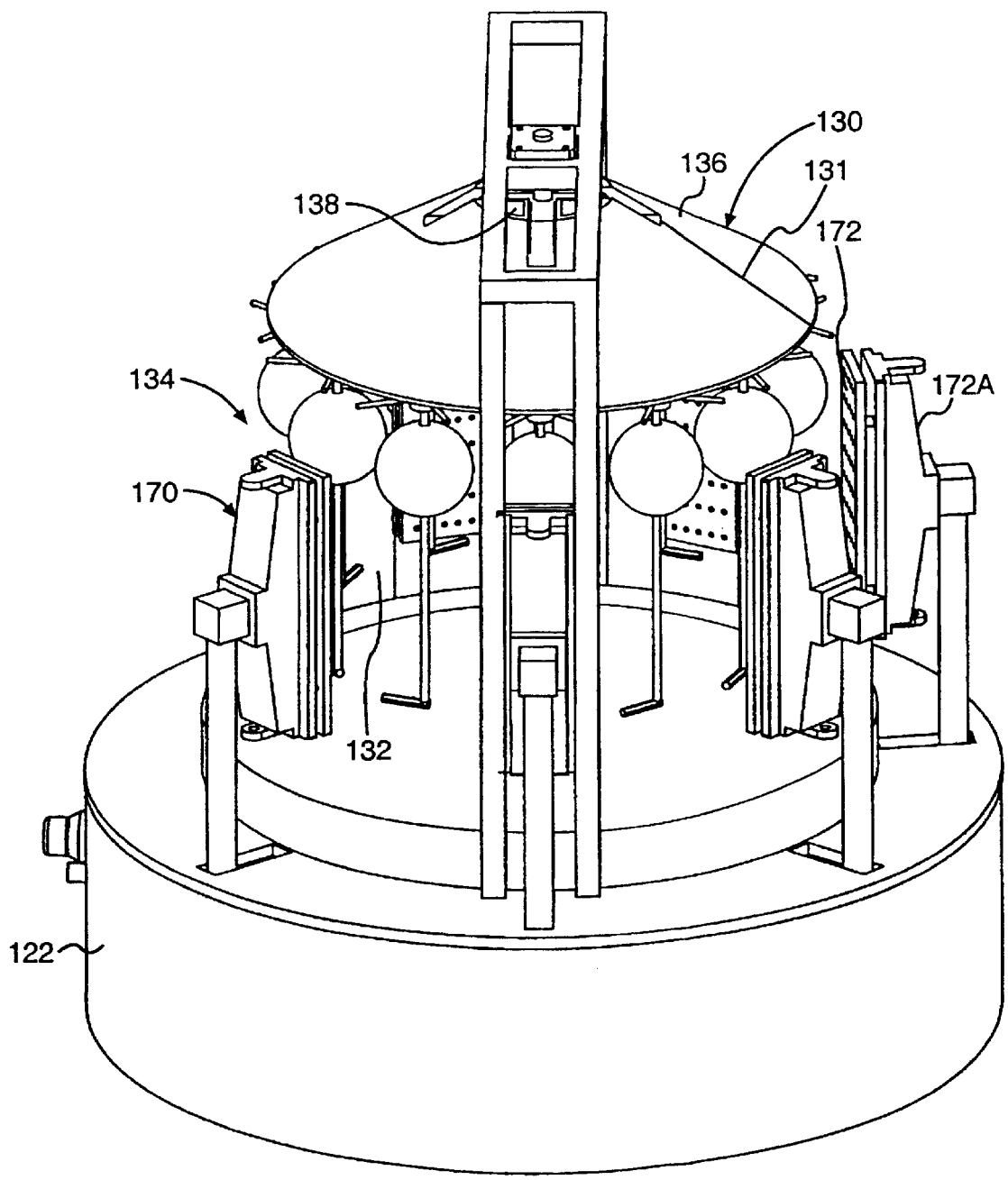
FIG. 1 is a perspective, cutaway, elevational view of the automated oven-type cooking apparatus featuring an improved heating unit that radiates inwardly towards the core of the apparatus.

The present invention discloses an improved heating unit for an automated oven-type cooking apparatus. The contents of Singapore Patent Application No. 200000777-3 filed on Feb. 9, 2000 by the same applicant as the present invention are incorporated by reference to the extent the description relates to non-heating unit portion of the application. Specifically, the present invention relates to the arrangement of the heater of the heating unit FIG. 1 is a perspective, cutaway, elevational view of the automated oven-type cooking apparatus featuring an improved heating unit that radiates inwardly towards the core of the apparatus. FIG. 1 is substantially similar to the naan cooking module and meat cooking module as illustrated and described in FIG. 1A of Singapore Patent Application No. 200000777-3 by the same applicant except for the heating. Referring again to FIG. 1, an improved automated oven-type cooking apparatus 110 of the present invention comprises of at least one naan cooking module 130 and at least one meat cooking module 134 disposed on top of at least one base 122. Instead of being centrally located, a heating unit 170 of the present invention is located on top of the periphery of a base 122 of the automated oven-type cooking apparatus. The gas burner shown partially in FIG. 2 and the heaters assembly 172 and 172A are the same as those in Singapore Patent Application No. 200000777-3.

The arrangement of the present invention obviates the central burner housing structure of Singapore Patent Application No. 200000777-3. As a direct result, the weight of the improved automated oven-type cooking apparatus is reduced. Above all, it frees up a lot of space 132 for the meat cooking module 134. It follows that more meat skewers can be inserted into the meat cooking module per production run. More importantly, the orientation of the heaters 172 and 172A is directed substantially radially inwards towards the centre of the cooking apparatus 110. It means that non-professional kitchen staff can handle the cooking process with greater safety.

Again in FIG. 1, the convection of heat from an inwardly radiating set of heaters 170 generates better thermo environment for the cooking of bread-based products. Not only are most of the energy from the inwardly radiating heaters utilized by the meat cooking module, the convection of heat to the naan cooking module 130 is improved because the energy from the heaters not only dissipates from the gap between the support plate 136 and the heaters 170 but also the remaining inwardly directly heat through the convection holes 138. Consequently, the naan disposed on the support plate are browned more completely than that of the apparatus in Singapore Patent Application No. 200000777-3.

Figure 2:
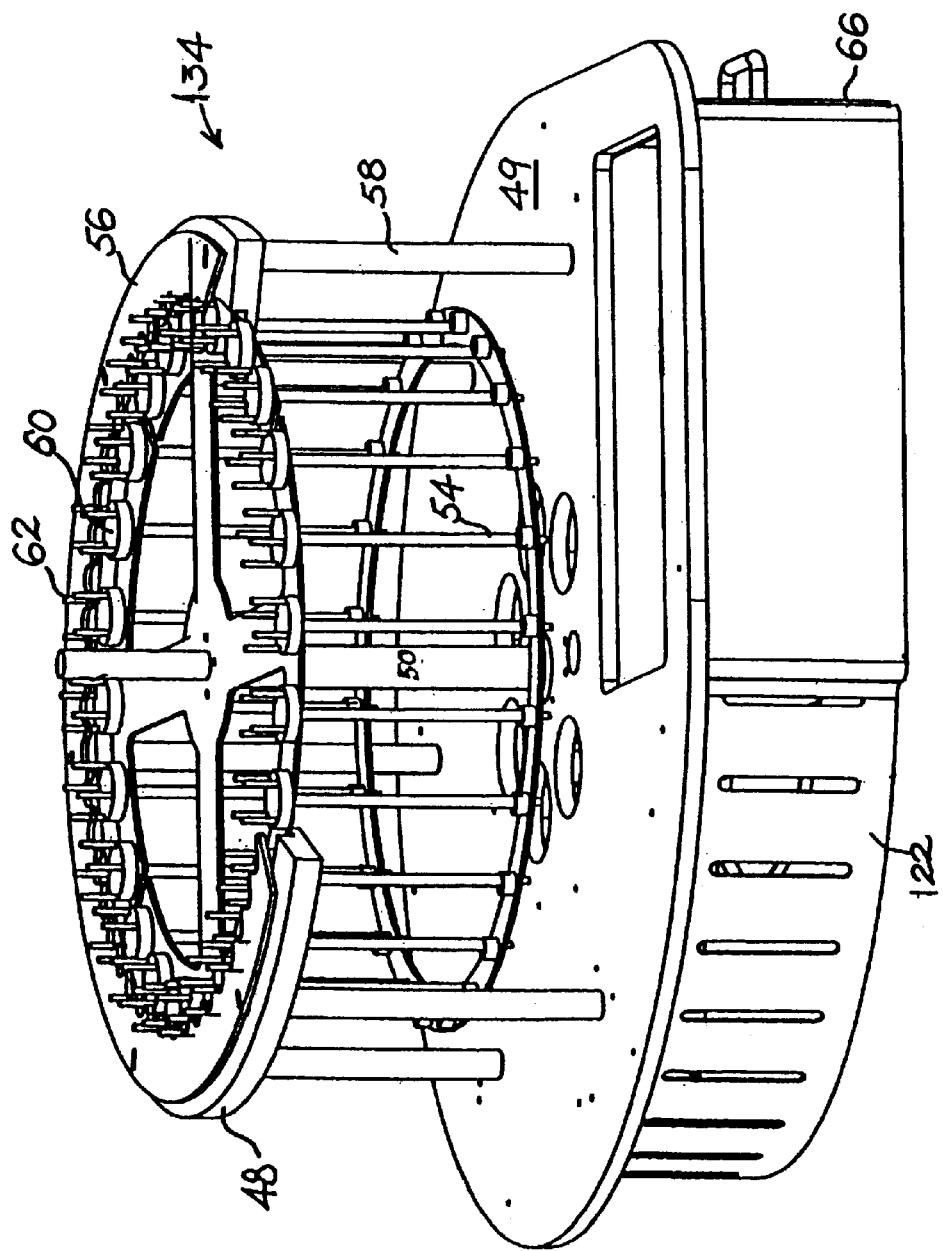
FIG. 2 is the side view of the meat cooking module coupled to the bottom plate.

FIG. 2 shows the meat cooking module 134 to be positioned below the support plate 136 and inside the heat unit. This meat cooking module is the same as the meat cooking module 34 described in Singapore Patent Application No. 20000777–3 except that, in this case, it is placed inside the heating unit 170. The meat cooking module 134 contains a skewer support rack 48 fixed onto a bottom plate 49. Rack 48 contain rack shaft 50, which runs through the center of the bottom plate 49, and is coupled to a rack motor (not shown ) housed within base 122. Rack 48 is adapted to support a substantially vertical array of skewers 54 inside the heating unit. A cam 56 supported by cam support 58 is provided to cause the skewers to rotate around their respective longitudinal axis as the rack revolves around the heating unit. Skewer 54 is provided with a skewer head 60, which contains four vertical fingers 62 that interact with the cam 56 to cause the rotation.

Once the bread products are baked and browned, a wire 131 disposed substantially in parallel and offset with the inclined surface of the support plate 136 removes the cooked bread products or naan from the bread cooking module automatically.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A cooking apparatus comprising:
   a housing;
   at least one heating unit disposed within and on the periphery of said housing, said heating unit radiates substantially radially inwards to the center of said cooking apparatus;
   at least one support plate provided above said heating unit, said support plate having an inclined surface for supporting and retaining flat dough for cooking;
   at least one support plate revolving means, coupled to said support plate, for rotating said support plate; and
   a means for maintaining the temperature of the top surface of said dough to allow equal cooking of top and bottom surfaces of said dough.

2. An apparatus according to claim 1 wherein said means for maintaining temperature is adapted to maintain the top surface of said dough to within 15° C. of the temperature of the bottom surface of said dough.

3. An apparatus according to claim 1 wherein said support plate has the shape of a cone with a truncated top, said truncated top provided with convection holes adapted to allow convection of hot air from said heating unit to the upper surface of said support plate.

4. An apparatus according to claim 1 wherein said support shaft rotating means comprises a central support shaft, coupled to the centre of said support plate at one end and to a motor at the other end.

5. An apparatus according to claim 1 wherein said heating unit further comprises at least one skewer support means adapted for supporting a substantially vertical array of skewers of food around the periphery of said heating unit.

6. An apparatus according to claim 1 wherein said heating unit comprises at least one gas burner and at least one infrared heater adapted to radiate infrared rays substantially radially inwards towards said array of skewers and the centre of said cooking apparatus.

7. An apparatus according to claim 5 wherein said skewer support means comprises at least one circular bracket coupled to at least one skewer shaft, said skewer shaft coupled to at least one skewer revolving means adapted to rotate said bracket.

8. An apparatus according to claim 5 wherein said skewer support means further comprises at least one cam means for the rotation of each of said skewer around its longitudinal axis.

9. An apparatus according to claim 1 wherein said support plate has at least one wire disposed substantially in parallel and offset from the top inclined surface of said support plate for removing cooked bread therefrom automatically.

10. An apparatus according to claim 8 wherein said cam means comprises at least one skewer head with extensions, connected to said skewer, and at least one cam provided proximate said car bracket, said cam adapted to interact with said extensions to rotate said skewer around its longitudinal axis as said skewer support means revolves.

11. A cooking apparatus comprising:
    a housing;
    a heating unit disposed on the periphery of said housing;
    a truncated cone-shaped support plate disposed above said heating unit, said support plate containing a flat top with holes disposed therein for convection of air heated by said heating unit; and
    a vertical drive shaft with one end connected to the center of said flat top and the other end coupled to a motor, said motor adapted to cause rotation of said support plate around said shaft.

12. A cooking apparatus according to claim 11 wherein said heating unit radiates heat radially inwards, said apparatus further comprising a meat cooking module for cooking meat on a skewer, said meat cooking module comprising
    a skewer support rack having a circular bracket with slots for hanging said skewers in a vertical parallel array around the periphery of said heating unit;
    a rack shaft coupled to said support rack at one end and a skewer motor at the other end, said skewer motor adapted to revolve said support rack around said rack shaft, and
    a cam disposed around said support rack and adapted for rotating each skewer around the longitudinal axis of said skewer.

13. A cooking apparatus according to claim 11 wherein said heating unit is a gas burning infrared heater adapted to radiate infrared rays radially inwards.

* * * * *

UNITED STATES PATENT AND TRADEMARK OFFICE
CERTIFICATE OF CORRECTION

PATENT NO. : 6,550,373 B2
DATED : April 22, 2003
INVENTOR(S) : Siavosh Hafezan

It is certified that error appears in the above-identified patent and that said Letters Patent is hereby corrected as shown below:

<u>Column 4,</u>
Line 18, after "claim" delete "8" and substitute therefor -- 7 --.
Line 21, delete "car" and substitute therefor -- circular --.

Signed and Sealed this

Twenty-third Day of March, 2004

JON W. DUDAS
*Acting Director of the United States Patent and Trademark Office*